(12) United States Patent
Earurnthavadi

(10) Patent No.: US 10,083,086 B2
(45) Date of Patent: Sep. 25, 2018

(54) SYSTEMS AND METHODS FOR AUTOMATICALLY RESUMING COMMISSIONING OF A PARTITION IMAGE AFTER A HALT IN THE COMMISSIONING PROCESS

(71) Applicant: Manoharan Govindarajan Earurnthavadi, Bangalore (IN)

(72) Inventor: Manoharan Govindarajan Earurnthavadi, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 43 days.

(21) Appl. No.: 15/135,651

(22) Filed: Apr. 22, 2016

(65) Prior Publication Data

US 2017/0308440 A1 Oct. 26, 2017

(51) Int. Cl.
  *G06F 11/00* (2006.01)
  *G06F 11/14* (2006.01)
  *G06F 9/48* (2006.01)
  *G06F 9/4401* (2018.01)

(52) U.S. Cl.
  CPC ........ *G06F 11/1438* (2013.01); *G06F 9/4406* (2013.01); *G06F 9/485* (2013.01); *G06F 2201/805* (2013.01); *G06F 2201/84* (2013.01)

(58) Field of Classification Search
  CPC ........ G06F 17/30088; G06F 17/30138; G06F 2201/48; G06F 3/0619
  See application file for complete search history.

(56) References Cited

U.S. PATENT DOCUMENTS

| | | | | |
|---|---|---|---|---|
| 5,835,953 A | * | 11/1998 | Ohran | G06F 11/1451 711/162 |
| 6,237,008 B1 | * | 5/2001 | Beal | G06F 3/0619 |
| 6,502,205 B1 | * | 12/2002 | Yanai | G06F 3/0601 714/6.32 |
| 7,111,026 B2 | * | 9/2006 | Sato | G06F 17/30008 |
| 8,700,871 B2 | * | 4/2014 | Saika | G06F 3/0604 707/610 |
| 8,959,299 B2 | * | 2/2015 | Ngo | G06F 11/1469 711/162 |
| 2004/0093474 A1 | * | 5/2004 | Lin | G06F 17/30138 711/162 |
| 2004/0117572 A1 | * | 6/2004 | Welsh | G06F 11/1451 711/162 |
| 2004/0186900 A1 | * | 9/2004 | Nakano | G06F 17/30067 709/213 |
| 2004/0267836 A1 | * | 12/2004 | Armangau | G06F 11/1435 |
| 2005/0240637 A1 | * | 10/2005 | Kawamura | G06F 11/1461 |

(Continued)

*Primary Examiner* — Bryce P Bonzo
*Assistant Examiner* — Jeison C Arcos

(57) ABSTRACT

Systems and methods for automatically resuming commissioning of a partition image after a halt in the commissioning process are disclosed. Embodiments may include initiating a commissioning of a partition image. Embodiments may also include updating metadata associated with the commissioning of the partition image after each successfully executed step of the commissioning process. Embodiments may further include identifying a halt in the commissioning process and resuming, after the halt has been identified, the commissioning process from the last successfully executed step of the commissioning process stored in the metadata during the most recent update of the metadata.

9 Claims, 5 Drawing Sheets

(56) References Cited

U.S. PATENT DOCUMENTS

| | | | | |
|---|---|---|---|---|
| 2006/0047926 | A1* | 3/2006 | Zheng | G06F 3/0608 |
| | | | | 711/162 |
| 2006/0179261 | A1* | 8/2006 | Rajan | G06F 17/30067 |
| | | | | 711/162 |
| 2006/0224639 | A1* | 10/2006 | Watanabe | G06F 11/2097 |
| 2006/0242179 | A1* | 10/2006 | Chen | G06F 3/0605 |
| 2007/0192553 | A1* | 8/2007 | Otani | G06F 11/1456 |
| | | | | 711/162 |
| 2008/0046432 | A1* | 2/2008 | Anderson | G06F 17/30088 |
| 2009/0055607 | A1* | 2/2009 | Schack | G06F 11/1435 |
| | | | | 711/162 |
| 2009/0070390 | A1* | 3/2009 | Okada | G06F 11/1469 |
| 2009/0077097 | A1* | 3/2009 | Lacapra | G06F 17/30079 |
| 2009/0106255 | A1* | 4/2009 | Lacapra | G06F 11/1076 |
| 2011/0161299 | A1* | 6/2011 | Prahlad | G06F 17/30091 |
| | | | | 707/649 |
| 2011/0295797 | A1* | 12/2011 | Akirav | G06F 17/30578 |
| | | | | 707/613 |
| 2012/0226660 | A1* | 9/2012 | Akirav | G06F 17/30578 |
| | | | | 707/613 |
| 2014/0344222 | A1* | 11/2014 | Morris | G06F 17/30215 |
| | | | | 707/634 |
| 2015/0066858 | A1* | 3/2015 | Sabdar | G06F 17/30088 |
| | | | | 707/639 |

* cited by examiner

SYSTEMS AND METHODS FOR AUTOMATICALLY RESUMING COMMISSIONING OF A PARTITION IMAGE AFTER A HALT IN THE COMMISSIONING PROCESS

FIELD OF THE DISCLOSURE

The instant, disclosure relates to computing systems. More specifically, this disclosure relates to automatically resuming commissioning of a partition image on a computing system after a halt in the commissioning process.

BACKGROUND

A commissioning of a partition image on a computing system often requires that a sequence of steps be executed in a specific order. In conventional system, when any of the steps in the commissioning process fail to execute, for example, due to a failure in the software or hardware executing the commissioning process, the user must manually restart the commissioning process from the beginning of the commissioning process. Restarting the commissioning process from the beginning has numerous drawbacks. For example, restarting results in inefficient use of the computing system's resources because some steps get re-executed numerous times and it is an overhead on the user to perform the same action again and again. In addition, the availability of the partition image on the computing system is unnecessarily delayed due to a complete restart, especially when the commissioning process is restarted more than once. Accordingly, the handling of the commissioning of partition images on conventional computing systems is less than optimal.

SUMMARY

Commissioning of a partition image on a computing system may be improved by resuming, after a halt in the commissioning of the partition image has been identified, the commissioning process from the last successfully executed step of the commissioning process. By resuming the commissioning process from the last successfully executed step of the commissioning process, the commissioning process may be resumed without restarting the commissioning process from the beginning of the commissioning process. In particular, a method for automatically resuming commissioning of a partition image after a halt in the commissioning process may include initiating, by a computing system, a commissioning of a partition image, wherein commissioning of the partition image comprises execution, by the computing system, of a sequence of steps specified by a commissioning process. The method may also include updating, by the computing system, metadata associated with the commissioning of the partition image after each successfully executed step of the commissioning process. The method may further include identifying, by the computing system, a halt in the commissioning process. The method may also include resuming, by the computing system, after the halt has been identified, the commissioning process from the last successfully executed step of the commissioning process stored in the metadata during the most recent update of the metadata.

According to another embodiment, a computer program product may include a non-transitory computer-readable medium comprising instructions which, when executed by a processor of a computing system, cause the processor to perform the step of initiating a commissioning of a partition image, wherein commissioning of the partition image comprises execution, by the computing system, of a sequence of steps specified by a commissioning process. The medium may also include instructions which, when executed by a processor of a computing system, cause the processor to perform the step of updating metadata associated with the commissioning of the partition image after each successfully executed step of the commissioning process. The medium may further include instructions which, when executed by a processor of a computing system, cause the processor to perform the step of identifying a halt in the commissioning process. The medium may also include instructions which, when executed by a processor of a computing system, cause the processor to perform the step of resuming, after the halt has been identified, the commissioning process from the last successfully executed step of the commissioning process stored in the metadata during the most recent update of the metadata.

According to yet another embodiment, an apparatus may include a memory and a processor coupled to the memory. The processor may be configured to execute the step of initiating a commissioning of a partition image, wherein commissioning of the partition image comprises execution, by the computing system, of a sequence of steps specified by a commissioning process. The processor may also be configured to execute the step of updating metadata associated with the commissioning of the partition image after each successfully executed step of the commissioning process. The processor may be further configured to execute the step of identifying a halt in the commissioning process. The processor may also be configured to execute the step of resuming, after the halt has been identified, the commissioning process from the last successfully executed step of the commissioning process stored in the metadata during the most recent update of the metadata.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

The handling of the commissioning of partition images on computing systems may be optimized by removing the need to restart the commissioning process from the beginning after the commissioning process has been halted. In some embodiments, the computing system may remove the need to restart the commissioning process by maintaining and managing a partially executed commissioning process before and after the computing system on which the commissioning process is being executed is unexpectedly halted. When the computing system is restored and operable after experiencing the halt, the computing system may utilize the information about the partially executed commissioning process stored in memory to resume execution of the commissioning process without having to restart the commissioning process. As a result, the drawbacks, such as inefficiency and delay, associated with the handling of commissioning processes by conventional systems may be reduced.

Figure 1:
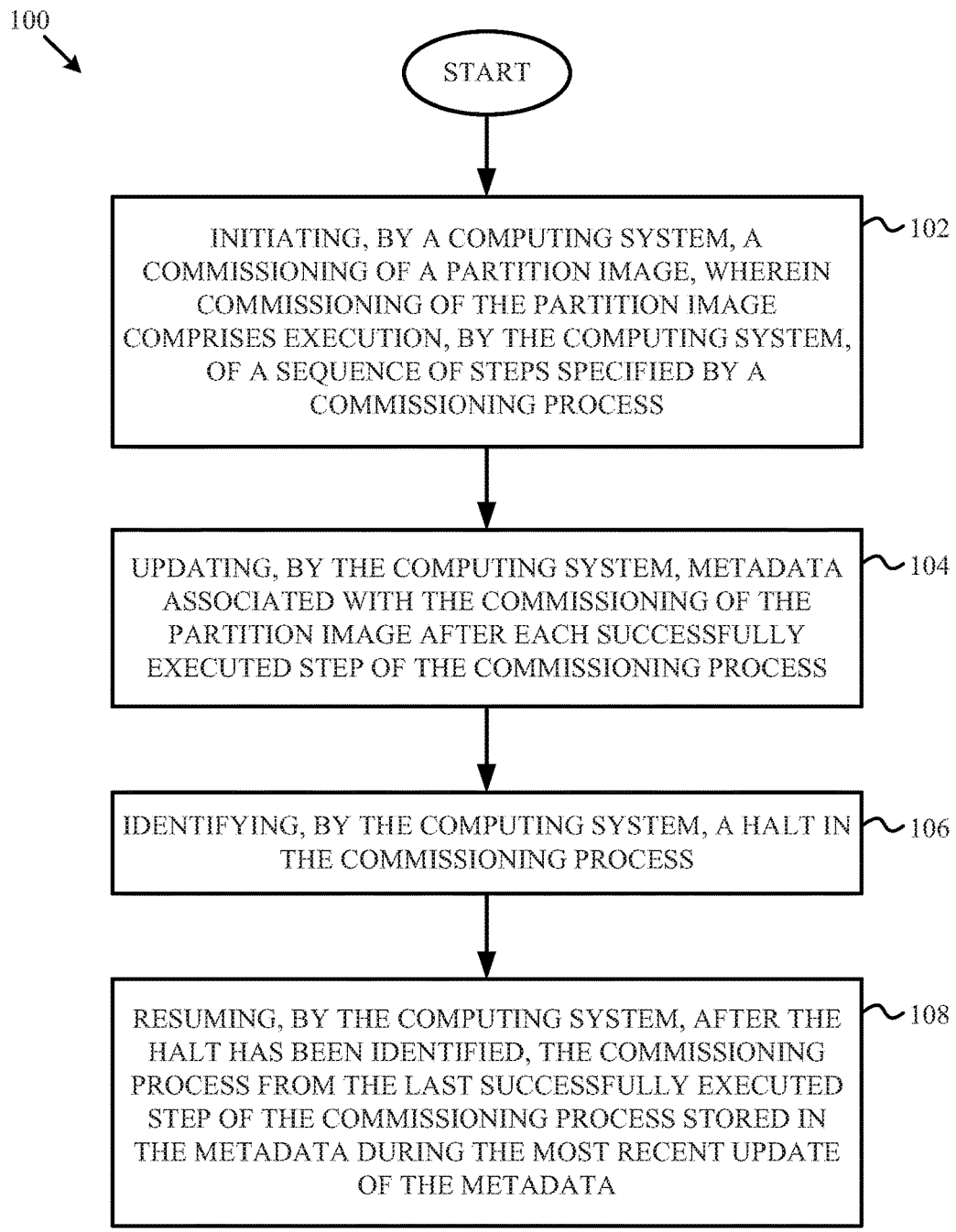
FIG. 1 is a flow chart illustrating a method for automatically resuming commissioning of a partition image after a halt in the commissioning process according to one embodiment of the disclosure.

FIG. 1 is a flow chart illustrating a method for automatically resuming commissioning of a partition image after a halt in the commissioning process according to one embodiment of the disclosure. It is noted that embodiments of method 100 may be implemented in accordance with the systems and embodiments described herein with respect to FIGS. 4 and 5. For example, embodiments of method 100 may be implemented by the computing systems illustrated in FIGS. 4 and 5, such as server 402 illustrated in FIG. 4 or computer system 500 illustrated in FIG. 5. In general, embodiments of method 100 may be implemented by other similar systems without deviating from this disclosure so long as the systems, whether directly or indirectly, support the operations as described herein.

Specifically, method 100 includes, at block 102, initiating, by a computing system, a commissioning of a partition image, wherein commissioning of the partition image includes execution, by the computing system, of a sequence of steps specified by a commissioning process. In some embodiments, the sequence of steps of the commissioning process includes at least acquiring hardware resources of the computing system and/or installing an operating system image instance. At block 104, method 100 includes updating, by the computing system, metadata associated with the commissioning of the partition image after each successfully executed step of the commissioning process.

Figure 2:
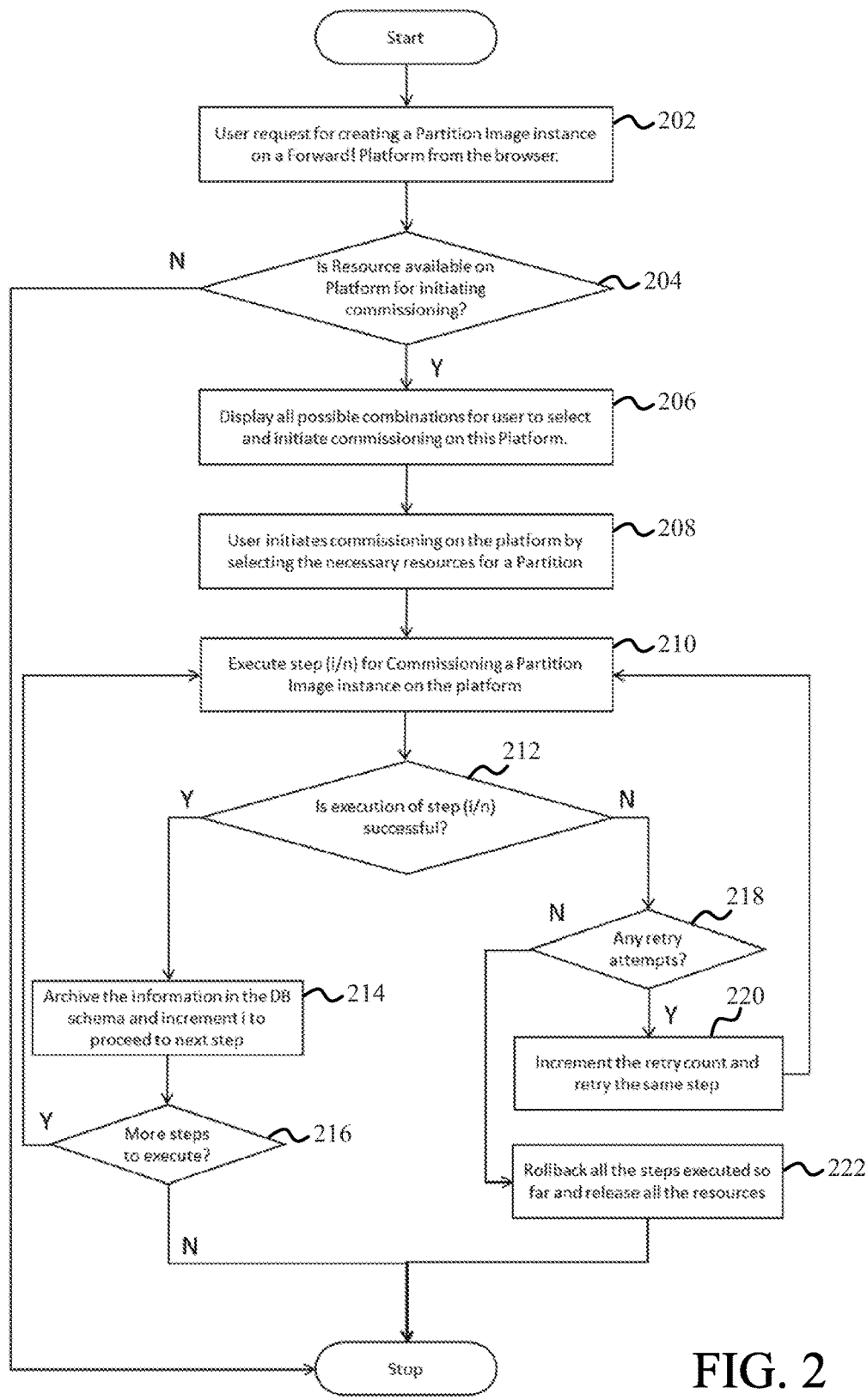
FIG. 2 is a flow chart illustrating a process for commissioning a partition image on a computing system according to one embodiment of the disclosure.

As an example, and not limitation, of the sequence of steps of a commissioning process, FIG. 2 provides a flow chart illustrating a process for commissioning a partition image on a computing system according to one embodiment of the disclosure. It is noted that embodiments of the flow chart illustrated in FIG. 2 may be implemented in accordance with the systems and embodiments described herein with respect to FIGS. 4 and 5. For example, embodiments of the flow chart illustrated in FIG. 2 may be implemented by the computing systems illustrated in FIGS. 4 and 5, such as server 402 illustrated in FIG. 4 or computer system 500 illustrated in FIG. 5. In general, embodiments of the flow chart illustrated in FIG. 2 may be implemented by other similar systems without deviating from this disclosure so long as the systems, whether directly or indirectly, support the operations as described herein.

As illustrated in FIG. 2, the computing system may, at block 202, receive a request from a user to create a partition image instance. In the embodiment of FIG. 2, the request may be received from a browser and is specific for a Forward! Platform. At block 204, the computing system may determine if resources are available on the platform for initiating the commissioning of the partition image. If the computing system determines that there are no resources available, the commissioning process may cease. If, however, the computing system determines that resources are available, then, at block 206, the computing system may display, for example, via a user interface, possible resource combinations for the user to select and initiate the commissioning process. At block 208, the computing system may initiate the commissioning process in accordance with the resource combination selected by the user.

At block 210, the computing system may begin the iterative process of executing each step in the commissioning process. In particular, as illustrated at block 210, the computing system may execute each step I of the total steps N of the process for commissioning a partition image on the computing system. At block 212, the computing system may determine if the step, I, of the commissioning process has been successfully executed. If, at block 212, the computing system determines that the step, I, successfully executed, then, at block 214, the computing system may archive the information associated with execution of the step in a database schema and proceed with the commissioning of the partition image. In some embodiments, archiving the information associated with execution of the step in a database schema may correspond to the updating of metadata associated with the commissioning of the partition image after each successfully executed step of the commissioning process, as detailed at block 104 of FIG. 1.

In some embodiments, metadata associated with the commissioning of the partition image may include data generated by the computing system describing at least the configurations and structure of the resources used for the commissioning of the partition image. For example, in one embodiment, a step of the commissioning process may include acquisition of hardware resources to be used for the commissioning of the partition image, and the metadata may include data about the hardware resources acquired during the step, such as identification information identifying the hardware resources acquired, size of the hardware resources, and configurations of the hardware resources. Accordingly, after the computing system determines, such as at block 212, that the step of the commissioning process that includes acquisition of hardware resources has been successfully executed, the computing system may, for example, at block 214, update the metadata associated with the commissioning of the partition image with the information about the hardware resources acquired.

In another embodiment, a step of the commissioning process may include installation of operating system image instances, and the metadata may include data generated by the computing system describing the operating system installed during the step, such as identification information identifying the operating system installed, size of the operating system in memory, and configurations of the operating system. Accordingly, after the computing system determines, such as at block 212, that the step of the commissioning process that includes installation of an operating system image instance has been successfully executed, the computing system may, for example, at block 214, update the metadata associated with the commissioning of the partition image with the information about the operating system installed.

According to an embodiment, the metadata may also include initiation information provided by a user of the computing system, such as information provided by the user at block 202. As an example, and not limitation, the request received at block 202 may include information about a specific partition image to commission, such as, for example, size and functionality of the partition image, resources to use for the partition image, operating systems to be used for the partition image, and the platform to be used for the partition image, In some embodiments, the metadata may be stored by the computing system in memory on the computing system, in memory external to the computing system, or in a combination of memory on the computing system and memory external to the computing system. In general, the metadata may be stored in any location so long as it is accessible by the computing system.

After the computing system has updated the metadata associated with the commissioning of the partition image, such as at block 214, the computing system may, at block 216, determine if there are more steps in the commissioning process that need to be executed. If there are more steps in the commissioning process that need to be executed, then the computing system may return to block 210 to execute the next step. Otherwise, if there are no more steps of the commissioning process that need to be executed, the computing system may terminate the commissioning process. In some embodiments, the computing system may output a notice indicating that the partition image has been successfully commissioned on the computing system when it determines that no more steps exist in the commissioning process that need execution.

Returning to block 212, if the computing system determines that the step, I, was not successfully executed, then, at block 218, the computing system may determine if a retry count limit has been reached. According to an embodiment, the retry count may refer to the number of times execution of a step of the commissioning process may be attempted. Once the execution attempts equal the retry count, no more attempts to execute the step may be allowed and the commissioning process may be terminated without successful completion. For example, if, at block 218, the computing system determines that the retry count limit has been reached, then the commissioning process may proceed to block 222. At block 222, the computing system may rollback the steps executed thus far in the commissioning process and release the resources acquired for the commissioning process. In other words, the computing system may clear the metadata and release the resources acquired for the commissioning process. If, however, at block 218, the computing system determines that the retry attempt limit has not been reached, then the computing system may proceed to block 220. At block 220, the computing system may increment a retry counter tracking the retry attempts and proceed to block 210 to retry to execute the step that did not successfully execute.

Returning to FIG. 1, at block 106, method 100 includes identifying, by the computing system, a halt in the commissioning process. In some embodiments, a halt in the commissioning process may include a failure in the commissioning process and/or an interruption to the commissioning process. In addition, the halt may be due to a software and/or hardware failure. For example, in one embodiment, a halt may correspond to a failure in a systems management tool on the computing system, such as a failure in the software stack of the systems management tool, a failure in the service provided by the systems management tool, or an unexpected shutdown of the systems management tool. In another embodiment, the halt may correspond to a hardware failure, such as an unexpected failure or shutdown of the hardware resources being used by the computing system to execute steps of the commissioning process. In still other embodiments, the halt may refer to failure in firmware operating on the computing system. In some embodiments, the failure may refer to any halt in the computing system that prevents execution of a step of the commissioning process. In some embodiments, the failure may refer to any halt of any services which are essential for software stack to be alive.

At block 108, method 100 includes resuming, by the computing system, after the halt has been identified, the commissioning process from the last successfully executed step of the commissioning process stored in the metadata during the most recent update of the metadata. In some embodiments, resuming the commissioning process may include resuming the commissioning process without restarting the commissioning process from the beginning of the commissioning process.

Figure 3:
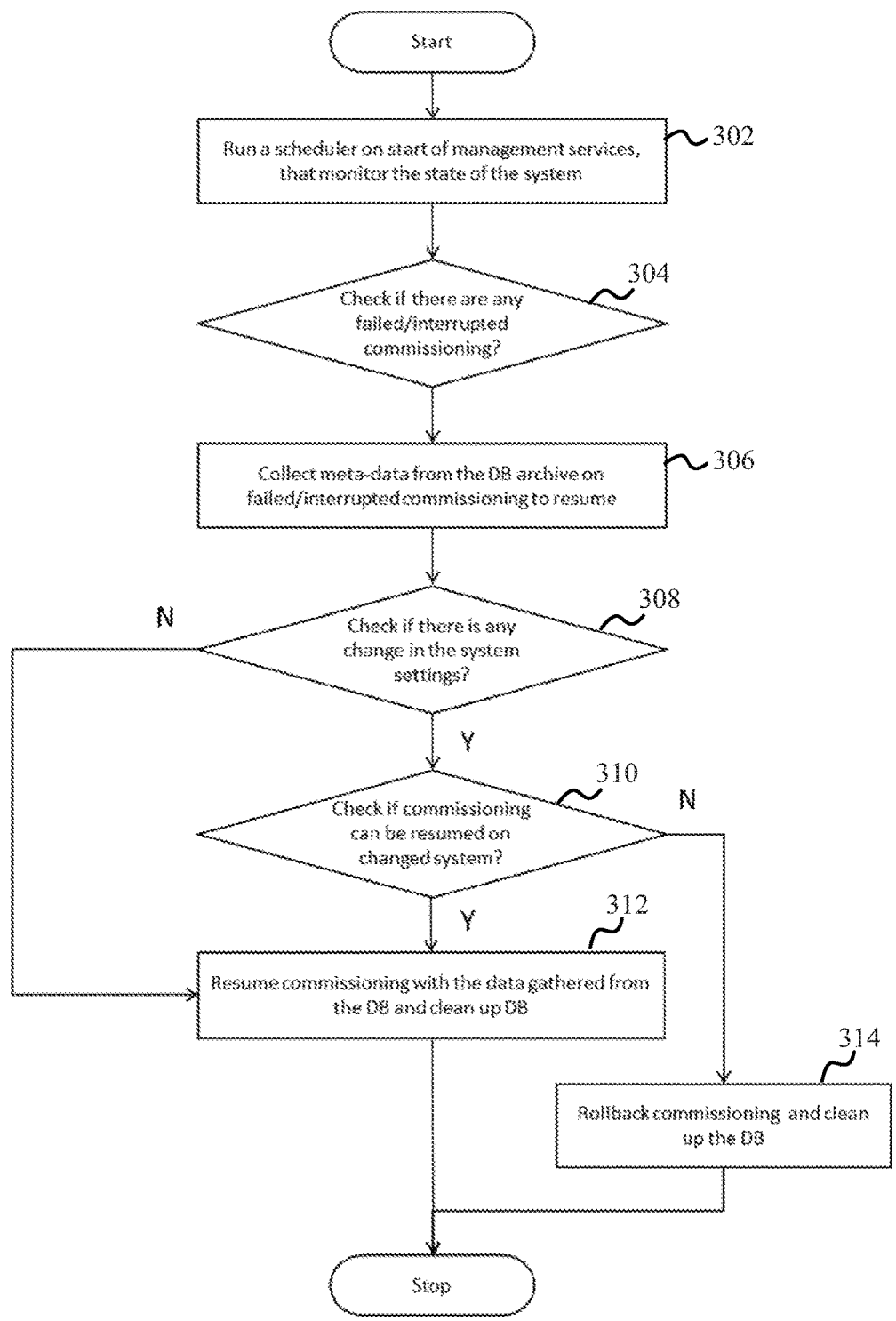
FIG. 3 is a flow chart illustrating some of the steps performed to automatically resume the commissioning of a partition image according to one embodiment of the disclosure.

As an example, and not limitation, of the process for resuming commissioning of the partition image, FIG. 3 provides a flow chart illustrating some of the steps performed to automatically resume the commissioning of a partition image according to one embodiment of the disclosure. It is noted that embodiments of the flow chart illustrated in FIG. 3 may be implemented in accordance with the systems and embodiments described herein with respect to FIGS. 4 and 5. For example, embodiments of the flow chart illustrated in FIG. 3 may be implemented by the computing systems illustrated in FIGS. 4 and 5, such as server 402 illustrated in FIG. 4 or computer system 500 illustrated in FIG. 5. In general, embodiments of the flow chart illustrated in FIG. 3 may be implemented by other similar systems without deviating from this disclosure so long as the systems, whether directly or indirectly, support the operations as described herein.

As illustrated in FIG. 3, at block 302 the computing system may execute a scheduler upon the starting of a systems management tool on the computing system. The computing system may run the scheduler to monitor the state of the computing system and the state of the commissioning process. For example, as illustrated at block 304, the computing system may check the commissioning process to determine if the commissioning process has experienced a failure or interruption. In other words, the computing system may monitor each step of the commissioning of the partition image so that it can identify, such as at block 106, when the commissioning process has been halted. If, at block 304, the computing system identifies a halt in the commissioning process, the computing system may, at block 306, collect metadata from a database where the metadata is archived to begin the process for resuming the commissioning process, such as the resumption of the commissioning process detailed at block 108. For example, in one embodiment, at block 306, the computing system may retrieve the updated metadata from memory after the halt has been identified. In some embodiments, the resumption of the commissioning process, such as the resumption described at block 108 of FIG. 1, may be effectuated based, at least in part, on the updated metadata retrieved from memory.

At block 308, the computing system may determine if settings of the computing system have changed between the time when the commissioning process was halted and the time when the updated metadata was retrieved. If, at block 308, the computing system determines that the settings of the computing system have not changed, the computing system may proceed to block 312, wherein the computing system may resume the commissioning process based on the updated metadata retrieved from memory. For example, as already noted, the updated metadata may store data describing at least the configurations and structure of the resources used for the commissioning of the partition image. Additionally, the updated metadata may store information about the data used by resources used by the computing system to execute the commissioning process. Because the updated metadata includes the data, settings, configurations, and structure of the resources that resulted from the successful execution of the steps of the commissioning process before the halt caused the commissioning process to stop, the updated metadata represents the most recent valid state of the commissioning process. Accordingly, the computing system may resume commissioning of the partition image without restarting the commissioning process by restoring the state of the commissioning process to the state represented in the updated metadata retrieved from memory and proceeding to the next step in the commissioning process that has not yet been executed.

By resuming commissioning of the partition image from the last successfully executed step of the commissioning process, the computing system disclosed herein may not suffer from the drawbacks associated with conventional systems. For example, the computing system operating according to embodiments of this disclosure may not suffer from inefficiency due to redundant execution of steps of the commissioning process because the computing system is capable of resuming execution after a halt in the commissioning process from the last successfully executed step of the commissioning process, thereby foregoing execution of some of the initial steps of the commissioning process. In addition, by foregoing the requirement to re execute each of the steps of the commissioning process, the computing system operating according to embodiments of this disclosure may complete the commissioning of the partition image in less time, thus reducing the overall delay associated with commissioning of the partition image on the computing system.

If, however, at block 308, the computing system determines that some of the settings of the computing system have changed between the time when the commissioning process was halted and the time when the updated metadata was retrieved, then the computing system may, at block 310, determine if the changes to the settings of the computing system prevent resumption of the commissioning process without restarting the commissioning process. Based on the determination made at block 310, the computing system may resume commissioning of the partition image or restart the commissioning process from the beginning of the commissioning process. For example, if at block 310, the computing system determines that the changes do not prevent resumption of the commissioning process from the last successfully executed step of the commissioning process, then the computing system may proceed to execute the step at block 312. In other words, when the settings of the computing system have changed and the changes to the settings of the computing system do not prevent resumption of the commissioning process from the last successfully executed step of the commissioning process, the computing system may, at block 312, update the metadata with the changes to the computing system and resume the commissioning process from the last successfully executed step of the commissioning process.

If, at block 310, the computing system determines that the changes to the settings of the computing system prevent resumption of the commissioning process, then the computing system may proceed to execute the step at block 314. In other words, when the settings of the computing system have changed and the changes to the settings of the computing system prevent resumption of the commissioning process, the computing system may, at block 314, restart the commissioning process from the beginning of the commissioning process. Specifically, at block 314, the computing system may rollback the steps executed thus far in the commissioning process and release the resources acquired for the commissioning process. In other words, the computing system may clear the metadata and release the resources acquired for the commissioning process.

The schematic flow chart diagram of FIG. 1 generally set forth as a logical flow chart diagram. As such, the depicted order and labeled steps are indicative of one embodiment of the disclosed method. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by various aspects of the systems disclosed herein. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Figure 4:
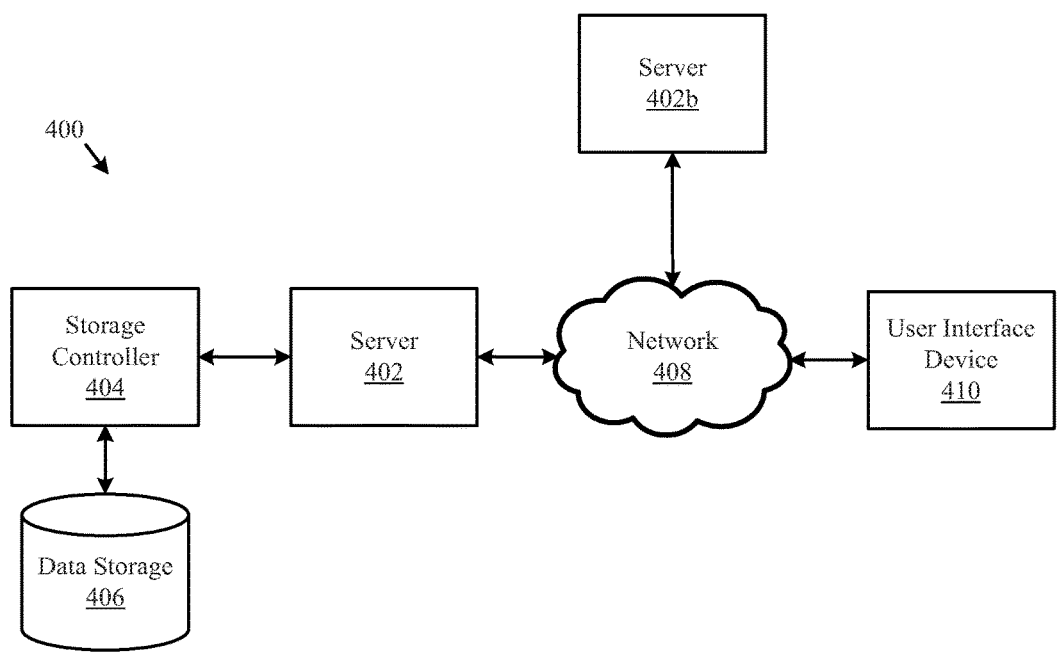
FIG. 4 is a block diagram illustrating a computer network according to one embodiment of the disclosure.

FIG. 4 illustrates one embodiment of a system 400 for automatically resuming commissioning of a partition image after a halt in the commissioning process according to one embodiment of the disclosure. The system 400 may include a server 402, a data storage device 406, a network 408, and a user interface device 410. The server 402 may also be a hypervisor-based system executing one or more guest partitions hosting operating systems with modules having server configuration information. In a further embodiment, the system 400 may include a storage controller 404, or a storage server configured to manage data communications between the data storage device 406 and the server 402 or other components in communication with the network 408. In an alternative embodiment, the storage controller 404 may be coupled to the network 408.

In one embodiment, the user interface device 410 is referred to broadly and is intended to encompass a suitable processor-based device such as a desktop computer, a laptop computer, a personal digital assistant (PDA) or tablet computer, a smartphone or other mobile communication device having access to the network 408. In a further embodiment, the user interface device 410 may access the Internet or other wide area or local area network to access a web application or web service hosted by the server 402 and may provide a user interface for enabling a user to enter or receive information.

Figure 5:
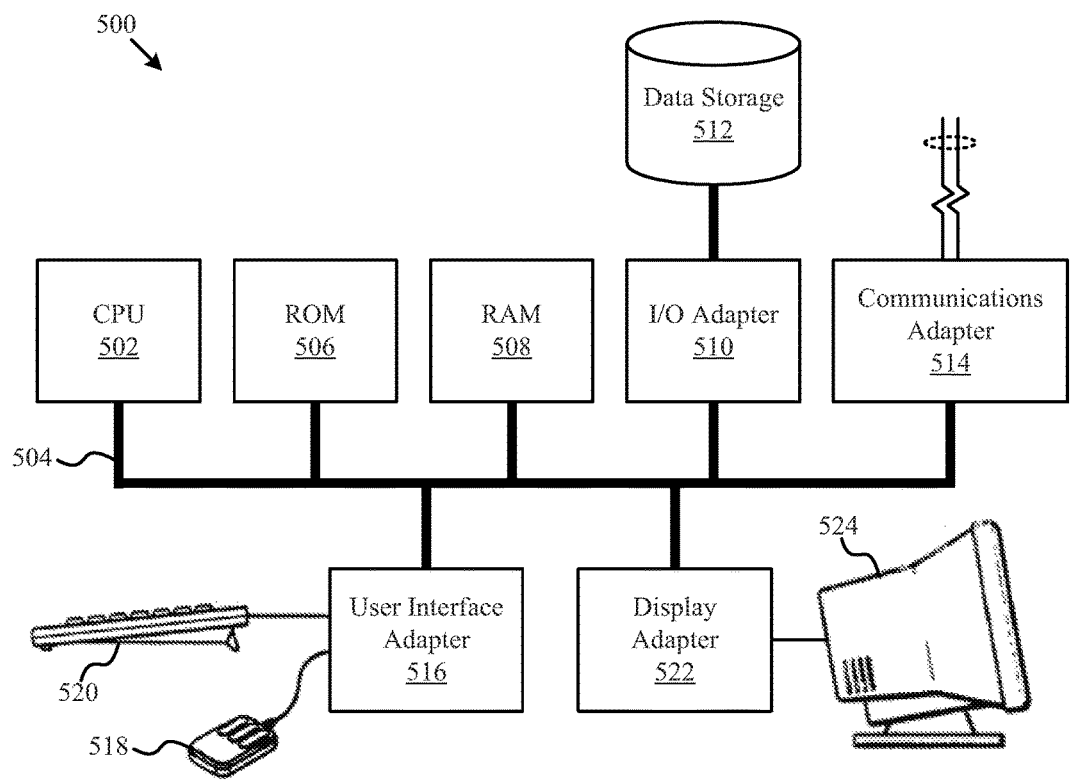
FIG. 5 is a block diagram illustrating a computer system according to one embodiment of the disclosure.

The network 408 may facilitate communications of data between the server 402 and the user interface device 410. In some embodiments, the network 402 may also facilitate communication of data between the server 402 and other servers/processors, such as server 402b. For example, the network 408 may include a switched fabric computer network communications link to facilitate communication between servers/processors, also referred to as data storage nodes. In some embodiments, the servers 402 and 402b may represent nodes or clusters of nodes managed by a software framework. The network 408 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, FIG. 5 illustrates a computer system 500 adapted according to certain embodiments of a server and/or a user interface device. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 may also include random access memory (RAM) 508, which may be synchronous RAM (SRAM), dynamic RAM (DRAM), synchronous dynamic RAM (SDRAM), or the like. The computer system 500 may utilize RAM 508 to store the various data structures used by a software application. The computer system 500 may also include read only memory (RUM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 may also include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to a network, which may be one or more of a LAN, WAN, and/or the Internet. The user interface adapter 516 couples user input devices, such as a keyboard 520, a pointing device 518, and/or a touch screen (not shown) to the computer system 500. The display adapter 522 may be driven by the CPU 502 to control the display on the display device 524. Any of the devices 502-522 may be physical and/or logical.

The applications of the present disclosure are not limited to the architecture of computer system 500. Rather the computer system 500 is provided as an example of one type of computing device that may be adapted to perform the functions of a server and/or the user interface device 510. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, in some embodiments, aspects of the computer system 500 may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data may be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for automatically resuming commissioning of a partition image after a halt in the commissioning process, comprising:
    initiating a commissioning process of a partition image, wherein commissioning of the partition image comprises execution, by the computing system, of a sequence of steps specified by a commissioning process;
    updating metadata associated with the commissioning process of the partition image after each successfully executed step of the commissioning process;
    identifying a halt in the commissioning process;
    resuming after the halt has been identified, the commissioning process from the last successfully executed step of the commissioning process stored in the metadata during the most recent update of the meta data;
    restarting the commissioning process from the beginning of the commissioning process when settings of the computing system have changed and the changes to the settings of the computing system prevent resumption of the commissioning process; and
    updating the metadata with the changes to the computing system and resuming the commissioning process from the last successfully executed step of the commissioning process when the settings of the computing system have changed and the changes to the settings of the computing system do not prevent resumption of the commissioning process from the last successfully executed step of the commissioning process.

2. The method of claim 1, further comprising retrieving the updated metadata from memory after the halt has been identified, wherein resumption of the commissioning process is effectuated based, at least in part, on the updated metadata retrieved.

3. The method of claim 2, further comprising determining if settings of the computing system have changed between the time when the commissioning process was halted and the time when the updated metadata was retrieved.

4. The method of claim 1, wherein the halt comprises at least one of a failure and an interruption.

5. The method of claim 1, wherein the sequence of steps of the commissioning process comprise at least one of acquiring hardware resources of the computing system and installing an operating system image instance.

6. An apparatus, comprising:
    a memory; and
    a processor coupled to the memory, wherein the processor is further configured to perform the steps of:
        initiating a commissioning process of a partition image, wherein commissioning of the partition image comprises execution, by the computing system, of a sequence of steps specified by a commissioning process;
        updating metadata associated with the commissioning process of the partition image after each successfully executed step of the commissioning process;
        identifying a halt in the commissioning process;
        resuming after the halt has been identified, the commissioning process from the last successfully executed step of the commissioning process stored in the metadata during the most recent update of the meta data;
        restarting the commissioning process from the beginning of the commissioning process when settings of the computing system have changed and the changes to the settings of the computing system prevent resumption of the commissioning process; and
        updating the metadata with the changes to the computing system and resuming the commissioning process from the last successfully executed step of the commissioning process when the settings of the computing system have changed and the changes to the settings of the computing system do not prevent resumption of the commissioning process from the last successfully executed step of the commissioning process.

7. The apparatus of claim 6, wherein the processor is further configured to perform the step of retrieving the updated metadata from memory after the halt has been identified, wherein resumption of the commissioning process is effectuated based, at least in part, on the updated metadata retrieved.

8. The apparatus of claim 7, wherein the processor is further configured to perform the step of determining if settings of the computing system have changed between the time when the commissioning process was halted and the time when the updated metadata was retrieved.

9. The apparatus of claim 6, wherein the halt comprises at least one of a failure and an interruption, and wherein the sequence of steps of the commissioning process comprise at least one of acquiring hardware resources of the computing system and installing an operating system image instance.

* * * * *